No. 634,280. Patented Oct. 3, 1899.
J. B. WEST.
CAR WHEEL.
(Application filed Dec. 7, 1898.)
(No Model.)
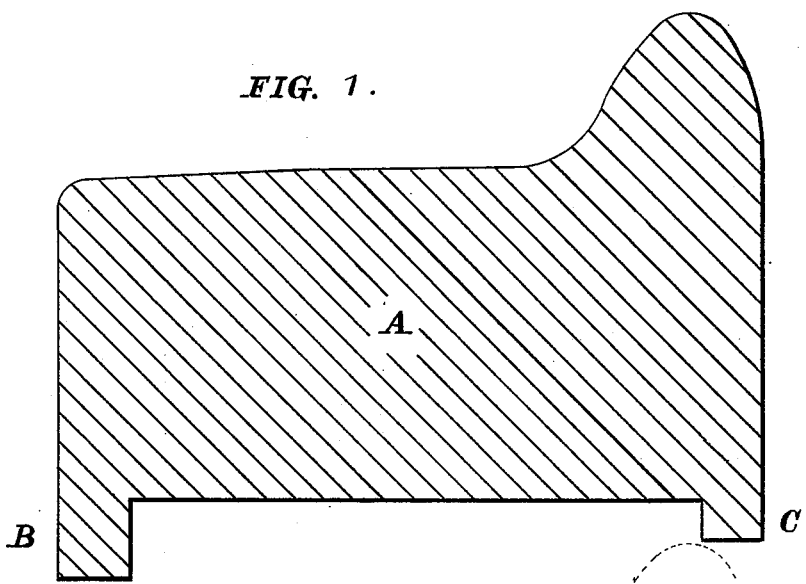
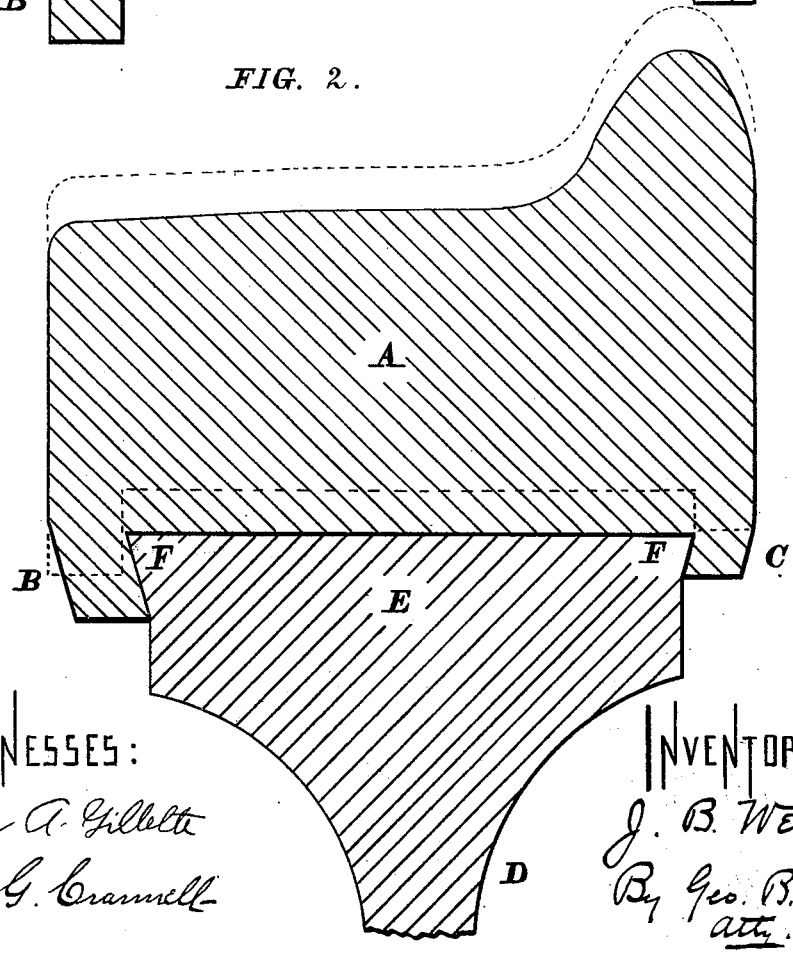
WITNESSES:
George A. Gillette
C. G. Cramwell
INVENTOR:
J. B. West.
By Geo. B. Selden,
atty.

United States Patent Office.

JONATHAN B. WEST, OF ROCHESTER, NEW YORK.

CAR-WHEEL.

SPECIFICATION forming part of Letters Patent No. 634,280, dated October 3, 1899.

Application filed December 7, 1898. Serial No. 698,522. (No model.)

*To all whom it may concern:*

Be it known that I, JONATHAN B. WEST, a citizen of the United States, residing at Rochester, in the county of Monroe, in the State of New York, have invented an Improvement in Car-Wheels, of which the following is a specification, reference being had to the accompanying drawings.

My invention relates to certain improvements in the construction of car-wheels having compressed tires whereby their manufacture is simplified and cheapened and the tires are more securely held on the wheel-centers.

My improvements are fully described and illustrated in the following specification and the accompanying drawings, the novel features thereof being specified in the claims annexed to the said specification.

In the accompanying drawings, Figure 1 is a radial section of the tire. Fig. 2 is a radial section of the tire and a portion of the wheel-center.

In the practical application of my invention I form the tire A of any ordinary or suitable shape, and I provide it on its inner corners with the continuous inwardly-projecting flanges B and C. Such a tire may be formed by rolling with rolls of suitable shape. The flange B on the outside of the wheel is preferably made heavier than that on the inside, (shown at C.) The wheel-center D, which may be of any suitable pattern or dimensions, is provided with the usual flange E around its periphery, and the outer edges or margins of the flange are beveled outward, as indicated at F F. These bevels are easily produced in turning the wheel-center. The width of the flange E, measured at the points of the bevels, corresponds with the distance between the inner faces of the flanges B and C on the tire. The diameter of the flange C is such as to permit the wheel-center to be placed inside the tire. After the tire has been applied to the wheel-center the tire is subjected to compression by any suitable mechanism—such, for instance, as the hydraulic tire-setter described in my Patent No. 520,817, dated June 5, 1894—so that it is upset or shortened in circumference and its inner surface pressed with any desired degree of force against the face of the wheel-center. This compression of the tire is represented by the full and dotted lines in Fig. 2. After the compression the bevels F F come inside the flanges B and C, and in order to secure the tire to the wheel-center these flanges are bent down over the bevels, as indicated in Fig. 1.

The operation of bending the flanges over the bevels may be performed by rolling, hammering, or in any other suitable way, and the flanges may be bent at the same time or one after the other.

It should be noted that by this method of manufacturing car-wheels the pressure can be regulated with exactness, the object being to prevent such a contracting effect upon the wheel-body as would impair it or possibly disrupt it, as might be the case if the tire were applied hot and the flanges pressed down in that condition.

By my improved construction the tire is not only firmly attached to the center and lateral displacement in either direction prevented, but the tire is secured in such a way that it will remain on the center if broken while running, and the expense and labor of making the wheel are materially reduced.

I claim—

1. The herein-described car-wheel, consisting of a metallic wheel-body provided with outwardly-flaring bevels on its outer edge, one on each side, and a continuous rolled tire, provided with two flanges on the inside, said tire being contracted by hydraulic pressure to fit said body, and the flanges on the inner part of the tire being bent inwardly to engage with the bevels on the wheel-body, whereby the amount of pressure exerted upon the tire for contracting it upon the periphery and sides of the wheel-body may be regulated with exactness, substantially as described.

2. The herein-described car-wheel, consisting of a wheel-body, turned true on its outer edge and provided with outwardly-flaring bevels on said edge, one on each side, and a continuous rolled tire, provided with a flange on its outer edge and with two flanges on its inner edge, the outer of these flanges being thicker and longer than the inner one, said tire being contracted by hydraulic pressure so as to fit said body and the flanges on the inner edge of said tire being bent inwardly to engage the bevels on the wheel-body, whereby the amount of pressure exerted upon the tire for contracting it upon the periphery and sides of the wheel-body may be regulated with exactness, substantially as described.

JONATHAN B. WEST.

Witnesses:
GEO. B. SELDEN,
C. G. CRANNELL.